United States Patent
Young et al.

(10) Patent No.: US 9,488,076 B2
(45) Date of Patent: Nov. 8, 2016

(54) METHOD OF REMANUFACTURING A ROCKER ARM AND REMANUFACTURED ROCKER ARM

(71) Applicant: Caterpillar Inc., Peoria, IL (US)

(72) Inventors: Taylor Young, Peoria, IL (US); Jonathan R. Eggemeyer, East Peoria, IL (US); Donald G. Clark, Iuka, MS (US); Curtis J. Graham, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 147 days.

(21) Appl. No.: 14/480,956

(22) Filed: Sep. 9, 2014

(65) Prior Publication Data

US 2016/0069222 A1     Mar. 10, 2016

(51) Int. Cl.
| | |
|---|---|
| *F01L 1/18* | (2006.01) |
| *F01L 1/46* | (2006.01) |
| *B23P 15/00* | (2006.01) |
| *F01L 13/06* | (2006.01) |

(52) U.S. Cl.
CPC ................. *F01L 1/18* (2013.01); *B23P 15/00* (2013.01); *F01L 1/46* (2013.01); *F01L 13/06* (2013.01); *F01L 2001/186* (2013.01); *F01L 2103/00* (2013.01)

(58) Field of Classification Search
CPC ............. F01L 1/18; F01L 1/46; F01L 13/06; F01L 2103/00; F01L 2001/186; B23P 15/00
USPC ........................................................ 123/90.39
See application file for complete search history.

(56) References Cited

U.S. PATENT DOCUMENTS

| | | | |
|---|---|---|---|
| 1,699,656 | A | 1/1929 | Fagan |
| 2,425,394 | A | 8/1947 | Ronfeldt |
| 4,674,453 | A | 6/1987 | Dove, Jr. |
| 4,995,281 | A | 2/1991 | Allor et al. |
| 8,251,038 | B2 | 8/2012 | Bach et al. |
| 8,291,927 | B2 | 10/2012 | Johnson et al. |
| 8,689,762 | B2 | 4/2014 | Bach et al. |

FOREIGN PATENT DOCUMENTS

| | | |
|---|---|---|
| DE | 102012219381 | 4/2014 |
| WO | 2012174697 | 12/2012 |

*Primary Examiner* — Zelalem Eshete
(74) *Attorney, Agent, or Firm* — Law Office of Kurt J. Fugman LLC

(57) ABSTRACT

A method of remanufacturing a rocker arm having a body defining a socket portion is disclosed. The method includes machining the socket portion to remove a worn surface and form a seat configured to receive an insert member therein. The method further includes disposing the insert member within the seat and coupling the insert member to the seat.

20 Claims, 7 Drawing Sheets

METHOD OF REMANUFACTURING A ROCKER ARM AND REMANUFACTURED ROCKER ARM

TECHNICAL FIELD

The present disclosure relates to a rocker arm, and more particularly to methods of remanufacturing a rocker arm.

BACKGROUND

An engine typically includes multiple rocker arms for actuating various valve train components, such as intake and exhaust valves, and fuel injectors. During normal operation of the engine, the rocker arms are controlled by a camshaft to actuate the corresponding intake valves, exhaust valves and fuel injectors. Such rocker arms may also perform an engine braking function. An engine braking system may actuate the rocker arms corresponding to the exhaust valves to open the exhaust valves in order to achieve engine braking. Further, the engine braking system may also use the rocker arm corresponding to the fuel injector to build a pressure that is required for actuating the engine braking system. Typically, a braking member of the engine braking system engages with the rocker arm for building oil pressure to a desired level. This may lead to wear of the rocker arm. Such wear may have an adverse effect on engine braking performance. Therefore, the rocker arm may require replacement.

U.S. Pat. No. 2,425,394 discloses an engine rocker arm. The engine rocker arm includes an arm member. The arm member includes a plurality of sheet metal layers provided with oppositely extending lugs at one end thereof. A hub is located in-between the ends. A cupped member is provided with ears, the cupped member being rigidly secured to the lugs.

SUMMARY OF THE DISCLOSURE

In one aspect of the present disclosure, a method of remanufacturing a rocker arm having a body defining a socket portion is provided. The method includes machining the socket portion to remove the worn surface and forming a seat configured to receive an insert member therein. The method further includes disposing the insert member within the seat and coupling the insert member to the seat.

In another aspect of the present disclosure, a rocker arm is provided. The rocker arm includes a body defining a socket portion. The socket portion is configured to receive a braking member therein. A seat is defined within the socket portion at an end thereof. The rocker arm further includes an insert member disposed within the seat of the socket portion and coupled to the socket portion. The insert member includes an inner surface configured to engage with the braking member.

In yet another aspect of the present disclosure, an engine is provided. The engine includes an engine body and an engine braking system disposed in the engine body. The engine braking system includes a braking member. A rocker arm is pivotally disposed in the engine body. The rocker arm includes a body defining a socket portion. The socket portion is configured to receive the braking member therein. A seat is defined within the socket portion at an end thereof. The rocker arm further includes an insert member disposed within the seat of the socket portion and coupled to the socket portion. The insert member includes an inner surface configured to engage with the braking member.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
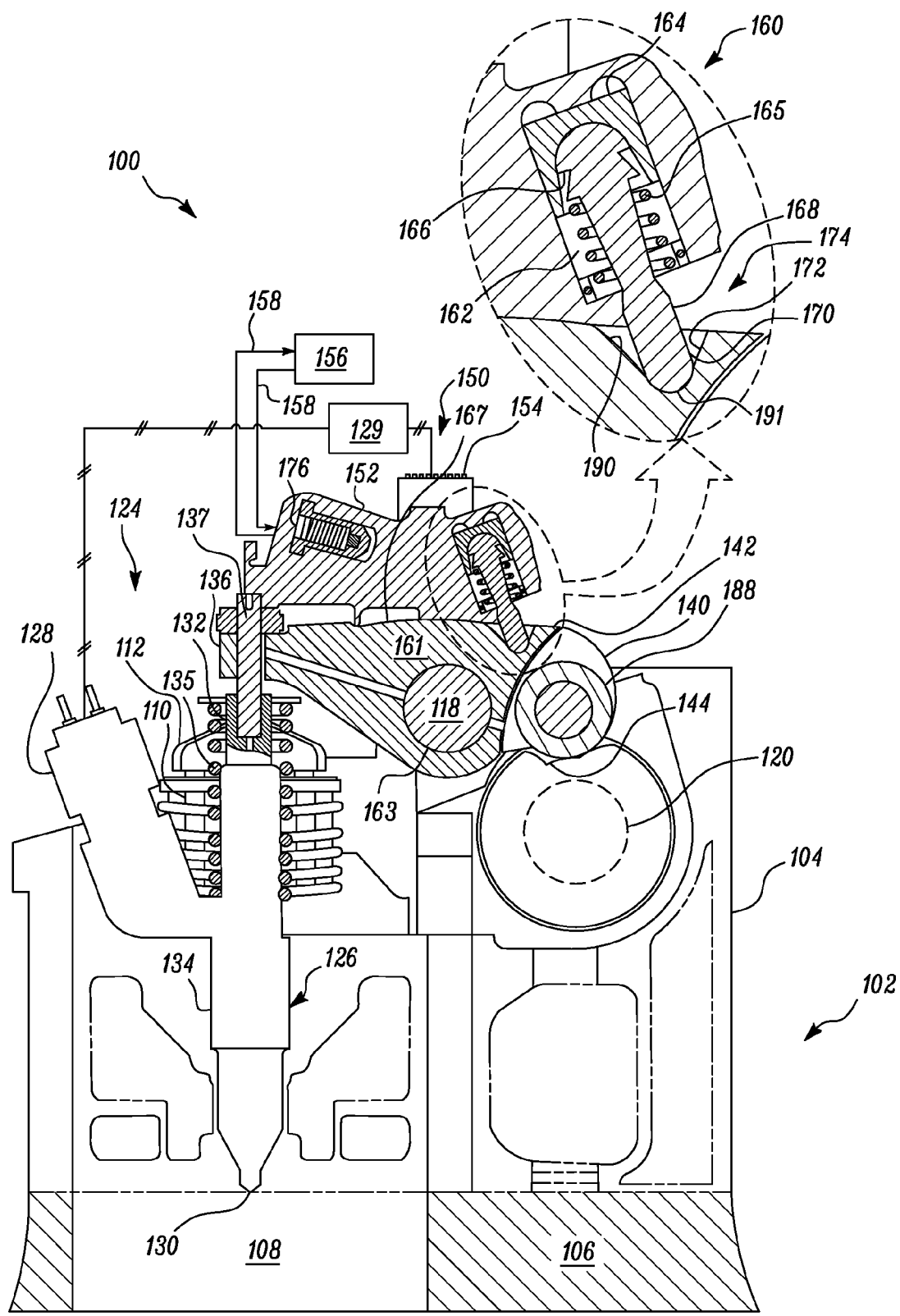
FIG. 1 is a schematic partial sectional view of an exemplary engine having an engine braking system.

FIG. 1 shows a partial sectional view of an exemplary engine 100. In the embodiment of FIG. 1, the engine 100 may be a compression ignition engine configured to combust a mixture of air and fuel. The fuel may be a liquid fuel, such as diesel or gasoline, and/or a gaseous fuel, such as Compressed Natural Gas (CNG). In alternative embodiments, the engine 100 may be a spark ignition engine or any multi-cylinder reciprocating internal combustion engine known in the art. The engine 100 may include an engine body 102 having a cylinder head 104 and a cylinder block 106 having an upper surface (not shown). The cylinder head 104 may be mounted on the upper surface of the cylinder block 106.

The cylinder block 106 may include one or more cylinders 108. The cylinder 108 may include a piston (not shown) that may be slidably disposed within the cylinder 108. In the illustrated embodiment, one cylinder 108 is shown in an inline configuration for illustration of the present disclosure. However, in various other embodiments, the cylinders 108 may be arranged in various other configurations, such as a V-configuration. The engine 100 may be configured for applications, such as motor vehicles, work machines, locomotives or marine applications.

The cylinder 108 may be provided with one or more intake valves (not shown) configured to selectively supply air for combustion with fuel in the cylinder 108. The intake valves may be disposed in the cylinder head 104. The intake valves may fluidly communicate an intake port (not shown) formed in the cylinder head 104 with the cylinder 108 in order to supply air. In an example, the cylinder 108 may be provided with a pair of intake valves. Each of the valves may be coupled to an intake bridge (not shown). The intake bridge may be operatively connected to a first end of an intake rocker arm (not shown). Further, a second end of the intake rocker arm may be configured to engage with an intake lobe (not shown) disposed on a camshaft 120 of the engine 100. Further, the intake rocker arm may be pivotally disposed on a shaft 118 to actuate the intake bridge based on rotation of the camshaft 120. The shaft 118 may be fixedly mounted in the cylinder head 104 to pivotally receive the intake rocker arm. During normal operation of the engine 100, the second end of the intake rocker arm may engage with the intake lobe of the camshaft 120 to actuate the intake valves. Thereby, air may be received in the cylinder 108 through the intake port.

In the embodiment of FIG. 1, the camshaft 120 may be rotatably disposed in the cylinder head 104. However, it may be contemplated that the camshaft 120 may be rotatably disposed at any location of the engine 100, for example, in the cylinder block 106. The camshaft 120 may be operatively coupled with a crankshaft (not shown) of the engine 100 via a drive, such as a gear drive.

The cylinder 108 may be further provided with one or more exhaust valves 110. The exhaust valves 110 may be configured to selectively discharge exhaust gas from the cylinder 108 after combustion process. An exhaust port (not shown) may be formed in the cylinder head 104 to allow discharge of exhaust gas from the cylinder 108. In an example, the cylinder 108 may be provided with a pair of exhaust valves 110. Further, each of the exhaust valves 110 may be coupled to an exhaust bridge 112. The exhaust bridge 112 may be configured to couple to a first end of an exhaust rocker arm (not shown). A second end of the exhaust rocker arm may be further configured to engage with an exhaust lobe (not shown) disposed on the camshaft 120. Further, the exhaust rocker arm may be pivotally disposed on the shaft 118 to actuate the exhaust bridge based on rotation of the camshaft 120. During normal operation of the engine 100, the second end of the exhaust rocker arm may engage with the exhaust lobe of the camshaft 120 to actuate the exhaust valves 110. Thereby, exhaust gas may exit the cylinder 108 through the exhaust port.

The engine 100 may further include a fuel supply system 124 in order to supply fuel to the cylinder 108 for combustion. The fuel supply system 124 may include a fuel reservoir (not shown) configured to accommodate fuel. The fuel supply system 124 may further include at least one fuel injector 126 corresponding to each of the cylinders 108. The fuel injector 126 may be disposed in the cylinder head 104 and configured to selectively supply fuel to the cylinder 108. The fuel injector 126 may be in fluid communication with the fuel reservoir for receiving fuel therefrom.

In the illustrated embodiment, one fuel injector 126 may be provided for each of the cylinders 108. In other embodiments, multiple fuel injectors 126 may be provided for each of the cylinders 108. The fuel injectors 126 may be connected to an electric connector 128. The electric connector 128 may be further communicated to a controller 129. The controller 129 may provide electric signals to the electric connector 128 to actuate the fuel injector 126 to selectively supply fuel to the cylinder 108.

The fuel injector 126 may include an injector tip 130 configured to inject fuel into the cylinder 108 and a plunger 132 slidably disposed within a housing 134 of the fuel injector 126. The plunger 132 may be biased by a spring 135 and configured to reciprocate within the housing 134 to pressurize fuel received therein. The plunger 132 may be further operatively coupled to a first end 136 of a rocker arm 140 via a connecting member 137. A second end 142 of the rocker arm 140 may be configured to engage with a lobe 144 of the camshaft 120. Further, the rocker arm 140 may be pivotally disposed on the shaft 118 to actuate the plunger 132 of the fuel injector 126 based on rotation of the camshaft 120.

The engine 100 may include an exemplary engine braking system 150. The engine braking system 150 may be associated with each of the cylinders 108 to selectively apply braking in one or more cylinders 108 as required. The engine braking system 150 may include a brake housing 152 disposed on the cylinder head 104. The engine braking system 150 may be in communication with the controller 129 via an electric connector 154. The controller 129 may selectively provide electric signals to one or more cylinders 108 to cause engine braking. The brake housing 152 may also be in fluid communication with an engine oil reservoir 156 via a fluid line 158 to receive oil. A pressure at which the oil is received from the engine oil reservoir 156 may be less than a pressure required to cause braking via the engine braking system 150. A pressure boosting mechanism 160 may be provided in the brake housing 152 to increase a pressure of the oil received within the brake housing 152. The pressure boosting mechanism 160 may include a brake cylinder 162 defined in the brake housing 152. A brake piston 164 may be slidably disposed within the brake cylinder 162 and biased to a retracted position by a spring 165. Further, the brake piston 164 may be coupled to a first end 166 of a braking member 168. A second end 170 of the braking member 168 may contact with an inner surface 172 of a socket portion 174 defined in the rocker arm 140. The socket portion 174 may be disposed adjacent to the second end 142 of the rocker arm 140. The brake piston 164 may be actuated from the retracted position against the biasing of the spring 165 due to the oil received in the brake cylinder 162 from the engine oil reservoir 156. It may be contemplated that the socket portion 174 may be disposed at any location between the first end 136 and the second end 142 of the rocker arm 140 in association with the pressure boosting mechanism 160. The engine braking system 150 may further include an accumulator 176 disposed within the brake housing 152. The accumulator 176 may be configured to store the oil at a pressure required for causing engine braking.

During normal operation of the engine 100, the rocker arm 140 engaged with the camshaft 120 may pivotally move based on the rotation of the camshaft 120 in order to inject fuel to the cylinder 108. Additionally, the braking member 168 engaged with the socket portion 174 may also reciprocate relative to the brake cylinder 162 to pressurize the oil received in the brake housing 152 from the engine oil reservoir 156. The pressurized oil may be then stored in the accumulator 176 to be supplied during operation of the engine braking system 150.

The engine braking system 150 may further include an exhaust braking member (not shown) slidably disposed within the brake housing 152. The exhaust braking member may be further configured to engage with a surface of the exhaust rocker arm. The exhaust braking member may be in fluid communication with the accumulator 176. During operation of the engine braking system 150, the exhaust braking member may actuate the exhaust rocker arm to open the exhaust valves 110 from a normally closed position. Opening of the exhaust valves 110 may discharge compressed air from the cylinder 108, thereby causing engine braking.

The engine braking system 150, as described above, is purely exemplary and the engine braking system 150 may be embodied in various alternative configurations within the scope of the present disclosure. For example, the engine braking system 150 may further include various other components including, but not limited to, one or more valves and one or more pressure regulators. These components may be actuated hydraulically and/or electrically for regulating and controlling flow of oil within the brake housing 152.

Figure 2:
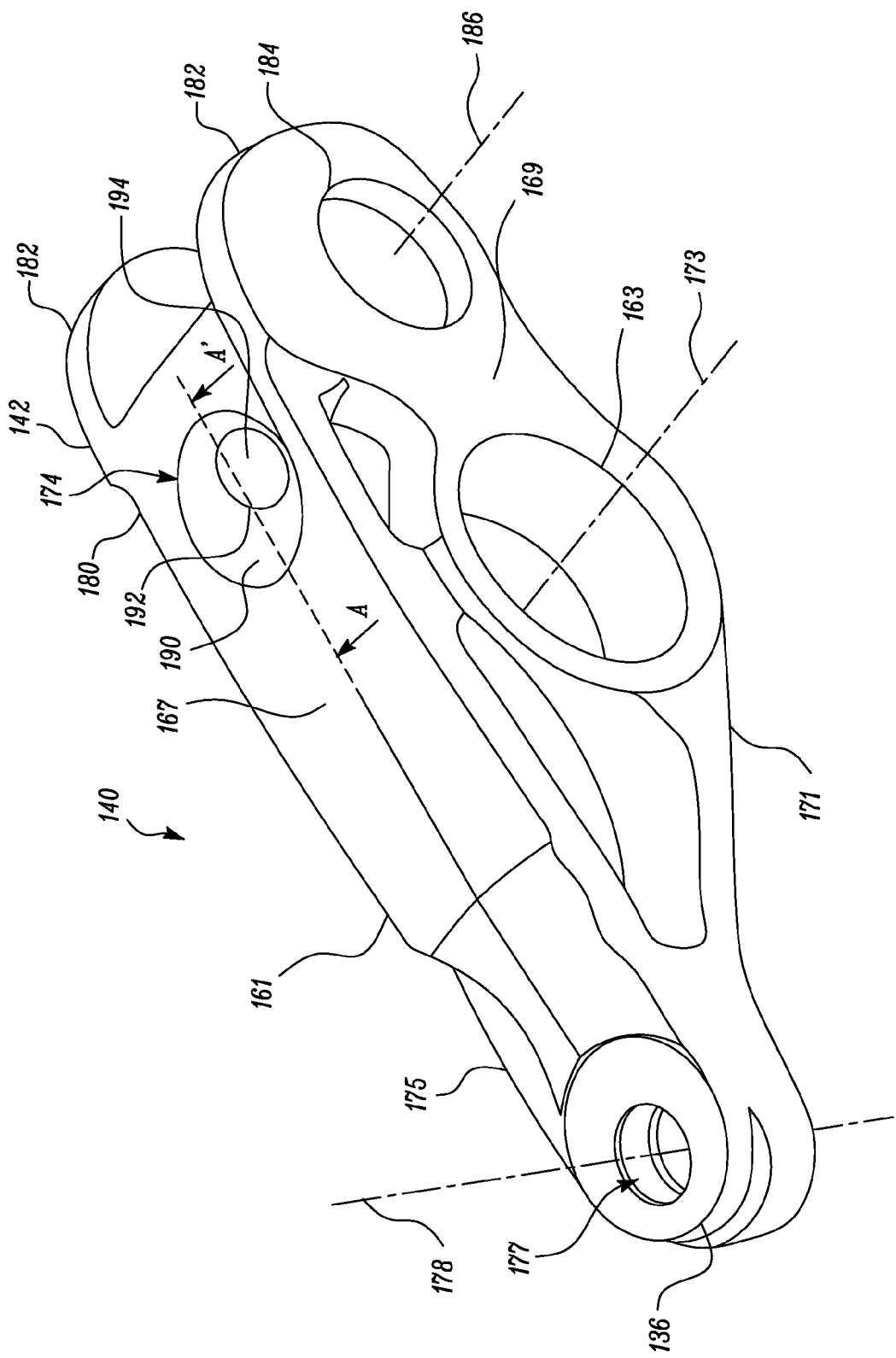
FIG. 2 is a perspective view of a rocker arm associated with the engine braking system.

FIG. 2 shows a perspective view of the rocker arm 140 associated with the engine braking system 150. The rocker arm 140 may include a body 161 defining a center hole 163. The body 161 may extend between the first end 136 and the second end 142 of the rocker arm 140. In an embodiment, the body 161 of the rocker arm 140 may be made from a material having a hardness of at least Rockwell 15N 85. However, it may be contemplated that the hardness of the material of the rocker arm 140 may be selected from a desired range of hardness based on design requirements. The body 161 may include a top surface 167, a pair of side surfaces 169 and a bottom surface 171. The center hole 163 may extend between the side surfaces 169 along a pivot axis 173. Further, the center hole 163 may be configured to receive the shaft 118 (shown in FIG. 1) disposed in the cylinder head 104. In an embodiment, a bearing member may be disposed in the center hole 163 to rotatably dispose the rocker arm 140 on the shaft 118. Thus, the rocker arm 140 may be configured to pivotally move about the pivot axis 173.

The body 161 of the rocker arm 140 may further include a first arm 175 extending from the center hole 163. More specifically, the first arm 175 may extend between the pivot axis 173 and the first end 136. A hole 177 may be formed adjacent to the first end 136 along an axis 178. Further, the hole 177 may extend between the top surface 167 and the bottom surface 171 of the rocker arm 140 to receive the connecting member 137 (shown in FIG. 1). The body 161 may further include a second arm 180 extending from the center hole 163 in a direction opposite to the first arm 175. More specifically, the second arm 180 may extend between the pivot axis 173 and the second end 142. The second arm 180 may include a pair of extensions 182. Each of the pair of extensions 182 may include a hole 184 along an axis 186.

Referring to FIGS. 1 and 2, a roller 188 may be received in the holes 184 and rotatably disposed between the pair of extensions 182. The roller 188 may be configured to engage with the lobe 144 of the camshaft 120. Based on rotation of the camshaft 120, the lobe 144 may be configured to pivotally move the rocker arm 140 about the pivot axis 173. The plunger 132 may consequently reciprocate and pressurize fuel received in the fuel injector 126. Pressurized fuel is supplied to the cylinder 108. Further, the socket portion 174 is formed in the top surface 167 of the rocker arm 140 adjacent to the second end 142. The socket portion 174 may include the inner surface 172 configured to receive the second end 170 of the braking member 168. The inner surface 172 may include a first inner surface 190 extending from the top surface 167 towards the bottom surface 171 and a second inner surface 192 complementary to a surface 191 of the second end 170 of the braking member 168. The socket portion 174, as shown in FIG. 2, may include a worn surface 194. The worn surface 194 and construction of the socket portion 174 is described hereinafter in detail with reference to FIG. 3.

Figure 3:
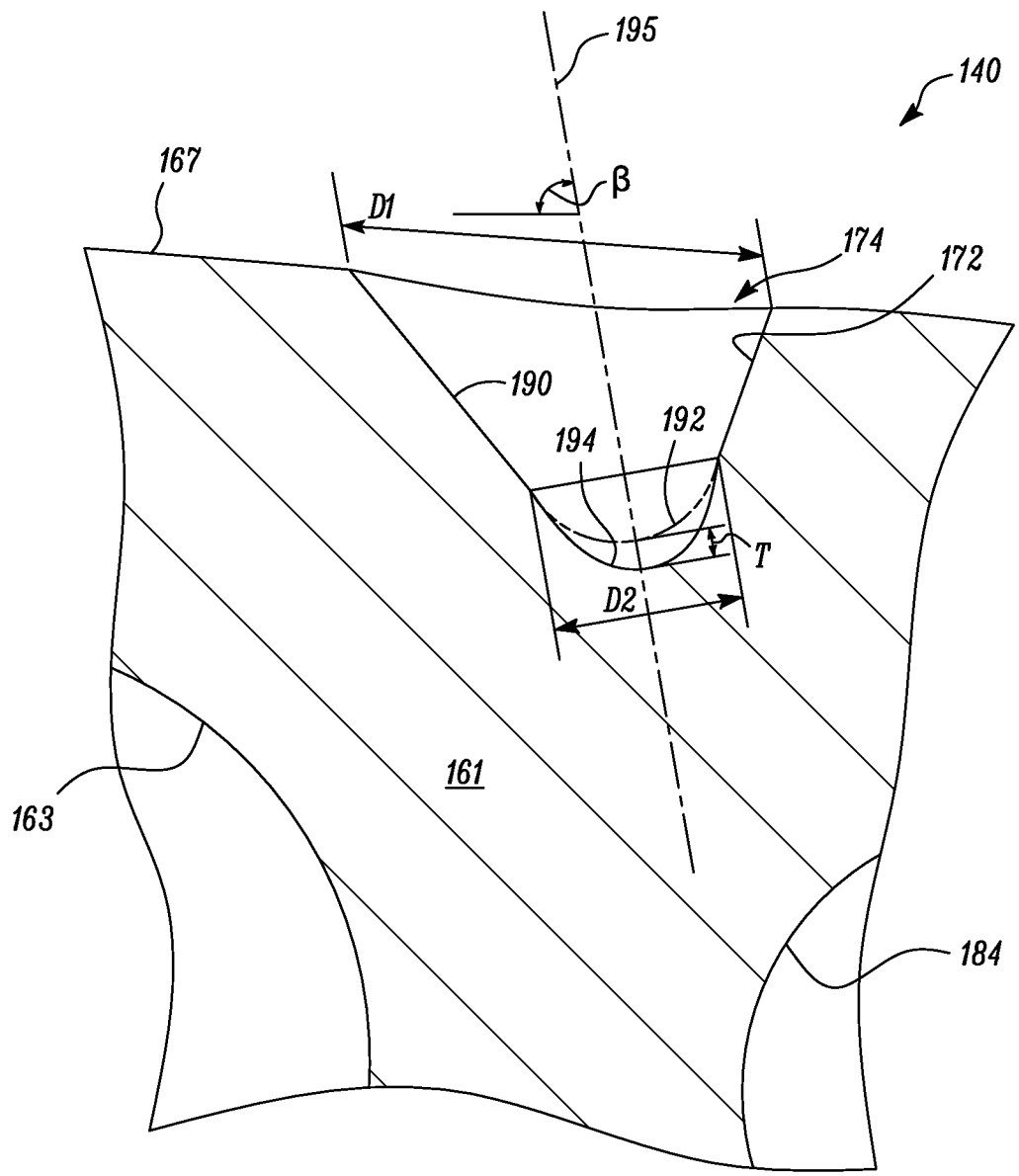
FIG. 3 is a partial sectional view of the rocker arm taken along line A-A' of FIG. 2 showing a socket portion with a wear surface.

FIG. 3 shows a partial sectional view of the rocker arm 140 taken along line A-A' of FIG. 2. As shown in FIG. 3, the second inner surface 192 is shown in dotted line for illustrating the worn surface 194 with reference to the second inner surface 192. The first inner surface 190 may have a first width 'D1' adjacent to the top surface 167. A width of the first inner surface 190 decreases from the top surface 167. Further, a width of the first inner surface 190 may reduce to a second width 'D2'. In an example, the first inner surface 190 may have a substantially truncated frustoconical shape about an axis 195. The axis 195 may be inclined at an angle 'β' with reference to the top surface 167 to angularly align with the braking member 168. Further, the second inner surface 192 may extend from the first inner surface 190 towards the bottom surface 171. The second inner surface 192 may be configured to engage with the corresponding surface 191 of the braking member 168. In the illustrated embodiment, the second inner surface 192 may be defined by a hemispherical depression at a bottom of the socket portion 174. The hemispherical depression may be configured to engage with the surface 191 of a corresponding hemispherical portion at the second end 170 of the braking member 168. It may be contemplated that a shape of the inner surface 172 may be any shape complementary to a shape of the second end 170 of the braking member 168. Further, the second inner surface 192 of the socket portion 174 may be symmetrical about the axis 195.

During normal operation of the engine 100, the oil received in the brake cylinder 162 may apply a force on the brake piston 164 against biasing of the spring 165. Additionally, the rocker arm 140 may exert a force on the braking member 168 to pressurize the oil in the brake cylinder 162. Engagement between the braking member 168 and the rocker arm 140 may lead to wear of the second inner surface 192. The second inner surface 192 may wear downwards along the axis 195 as the movement of the braking member 168 is along the axis 195. The worn surface 194 shown at a distance 'T' from the second inner surface 192 is exemplary in nature for illustrating wear of the second inner surface 192. The distance 'T' may be hereinafter referred as an extent of wear 'T' of the second inner surface 192. The extent of wear 'T' of the second inner surface 192 may vary based on a period of operation of the engine braking system 150, material properties of the rocker arm 140 and the braking member 168, magnitude of forces exerted by the braking member 168 etc. If the extent of wear 'T' exceeds beyond an acceptable limit, a braking performance of the engine braking system 150 may be affected. The rocker arm 140 may be required to be remanufactured in order to be reused with the engine braking system 150. The remanufacturing of the rocker arm 140 is described hereinafter in detail.

Figure 4:
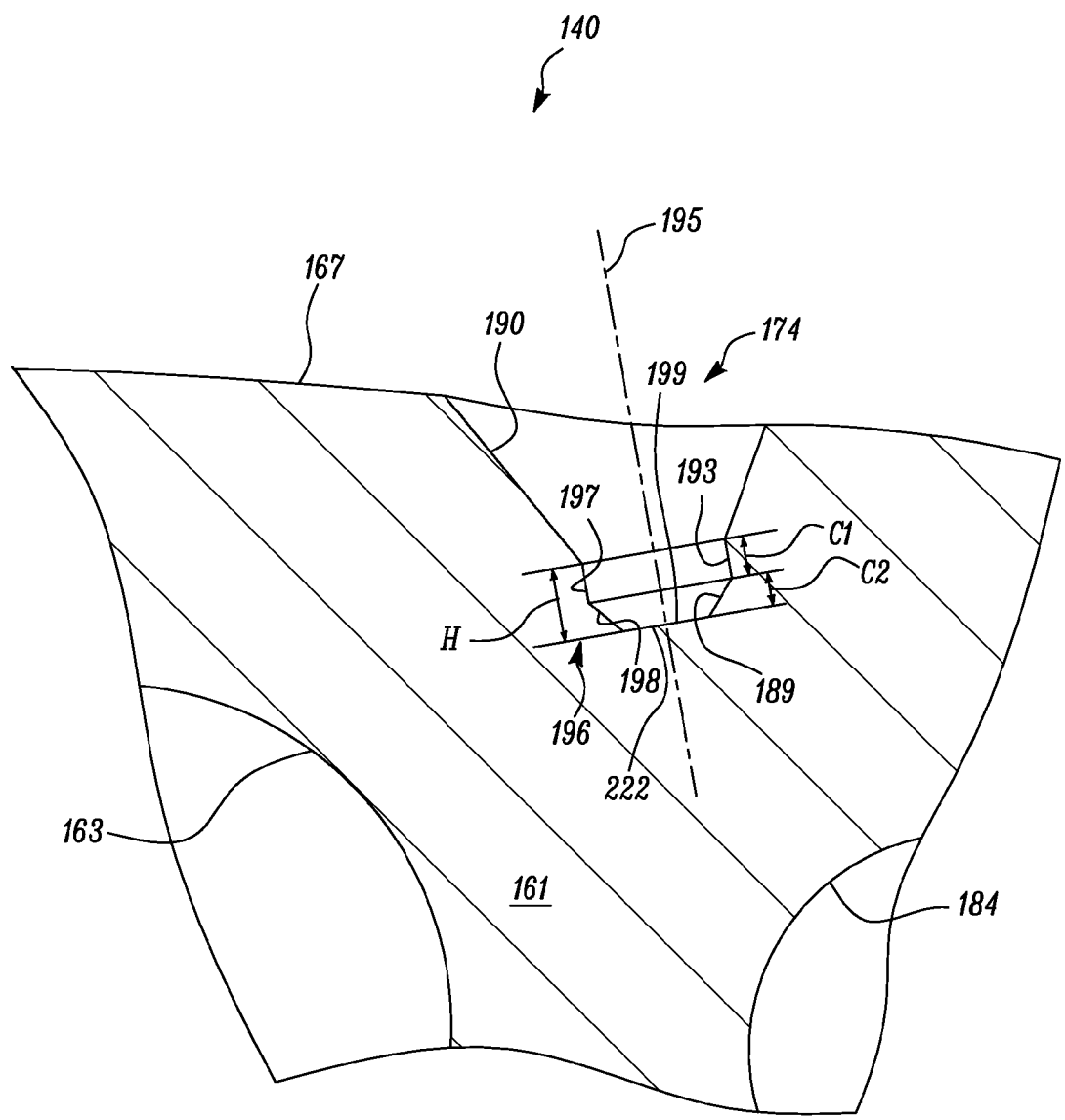
FIG. 4 is a sectional view of the rocker arm showing a machined socket portion configured to receive an insert member, according to an embodiment of the present disclosure.

FIG. 4 shows a sectional view of the rocker arm 140 having the socket portion 174 machined by one or more machining processes, according to an embodiment of the present disclosure. The worn surface 194 (shown in FIG. 3) may be machined to form a seat 196. The seat 196 may include a cylindrical seat section 197 and a frustoconical seat section 198 adjacent to the cylindrical seat section 197. The cylindrical seat section 197 and the frustoconical seat section 198 may be defined within a height 'H' of the seat 196. The cylindrical seat section 197 may extend from the first inner surface 190 and may have a length 'C1' along the axis 195. Further, the cylindrical seat section 197 may include an inner peripheral surface 193. The frustoconical seat section 198 may extend from the cylindrical seat section 197 and may a length 'C2' along the axis 195. Further, the frustoconical seat section 198 may include an inner peripheral surface 189. The machining process may include grinding, drilling, boring, reaming, milling, or a combination thereof. A geometry defined by the cylindrical seat section 197 and the frustoconical seat section 198 may be configured to receive an insert member 202 that is described in detail with reference to FIG. 5.

Figure 5:
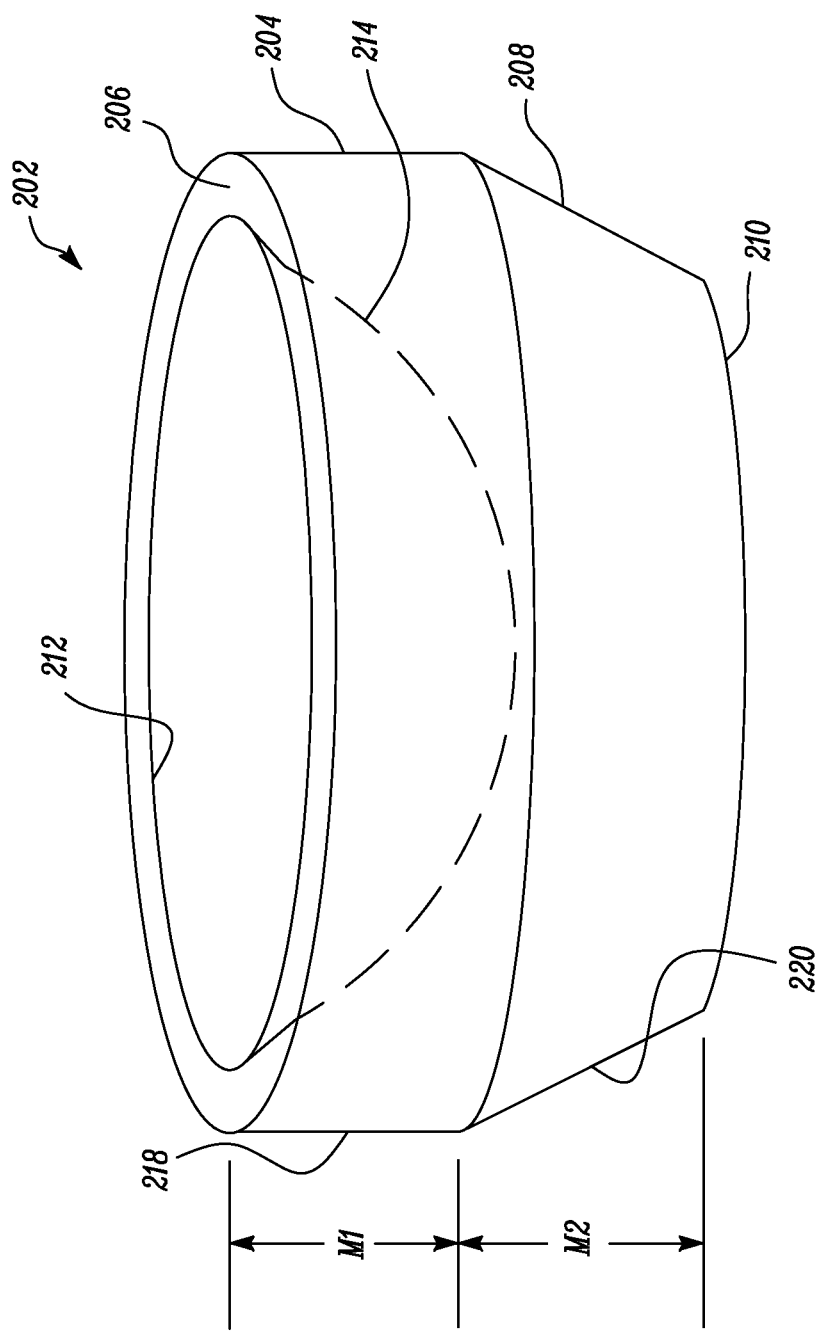
FIG. 5 is a perspective view of the insert member, according to an embodiment of the present disclosure.

FIG. 5 shows a perspective view of the insert member 202, according to an embodiment of the present disclosure. The insert member 202 may include a cylindrical portion 204 having a top surface 206 and a frustoconical portion 208 disposed adjacent to the cylindrical portion 204 and having a bottom surface 210. A depression 212 may be formed in the top surface 206 of the insert member 202. An inner surface 214 defined by the depression 212 may be substantially similar to the second inner surface 192 defined in the original socket portion 174. Additionally, the inner surface 214 of the insert member 202 may be further configured to engage with the surface 191 provided at the second end 170 of the braking member 168. In the illustrated embodiment, a hardness of a material of the insert member 202 may be greater than the hardness of the material of the rocker arm 140. In a further embodiment, the insert member 202 may be made from a material having a hardness of at least Rockwell 30N 77.

Referring to FIGS. 4 and 5, the cylindrical portion 204 may include a length 'M1' substantially similar to the length 'C1' and an outer surface 218 configured to engage with the inner peripheral surface 193 of the cylindrical seat section 197. Similarly, the frustoconical portion 208 may include a length 'M2' substantially similar to the length 'C2' and an outer surface 220 configured to engage with the inner peripheral surface 189 of the frustoconical seat section 198. The bottom surface 210 of the frustoconical portion 208 may be configured to engage with a surface 199 at an end 222 of the frustoconical seat section 198. Thus, an outer geometry of the insert member 202 may be configured to engage with an inner geometry of the seat 196.

Figure 6:
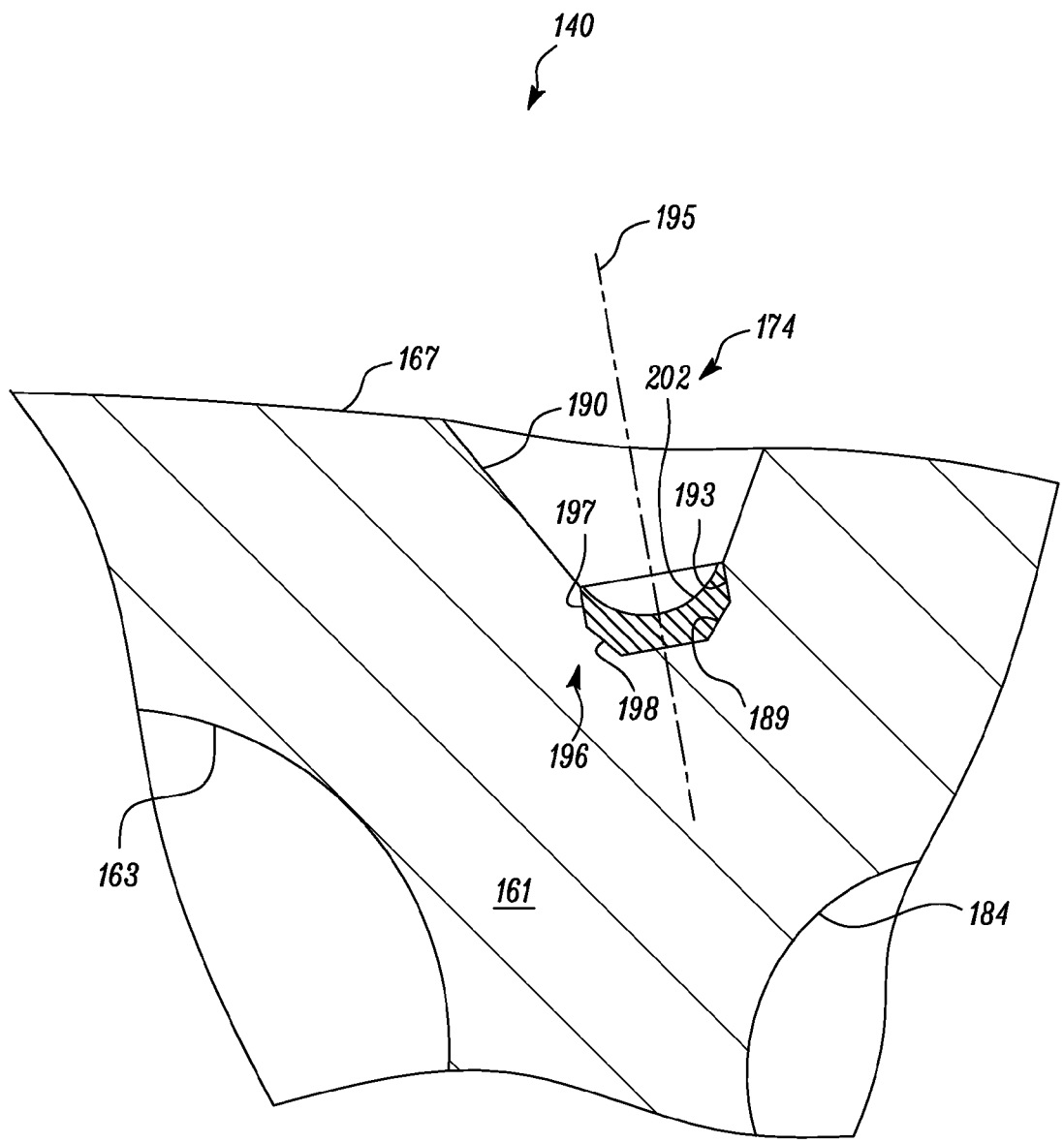
FIG. 6 is a sectional view of the rocker arm showing the socket portion having the insert member disposed therein, according to an embodiment of the present disclosure.
Figure 7:
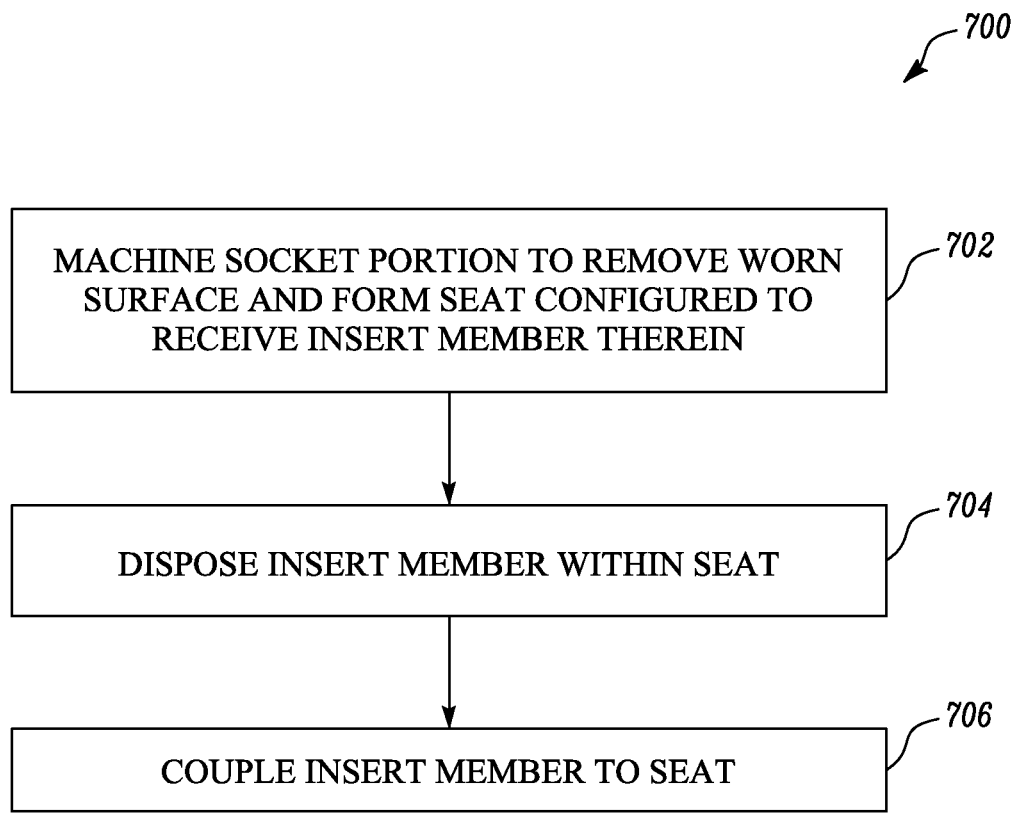
FIG. 7 is a flowchart of a method of remanufacturing the rocker arm, according to an embodiment of the present disclosure.

FIG. 6 is a sectional view of the rocker arm 140 showing the socket portion 174 having the insert member 202 disposed therein, according to an embodiment of the present disclosure. The insert member 202 may be aligned with the seat 196 and coupled to the seat 196. In an embodiment of the present disclosure, the insert member 202 may be coupled to the seat 196 by press fitting. The outer surface 218 of the cylindrical portion 204 may engage with the inner peripheral surface 193 of the cylindrical seat section 197. Similarly, the outer surface 218 of the frustoconical portion 208 may engage with the inner peripheral surface 189 of the frustoconical seat section 198. In another embodiment of the present disclosure, the insert member 202 may be coupled to the seat 196 by welding.

INDUSTRIAL APPLICABILITY

An engine typically includes multiple rocker arms for actuating the exhaust valves and fuel injectors. The rocker arms may also be operatively connected to an engine braking system. The rocker arms corresponding to the fuel injectors may be used to increase a pressure of oil to a desired level that is required for operation of the engine braking system. A braking member of the engine braking system may engage with the rocker arm for pressurizing the oil. This may lead to wear of the rocker arm, and thereby affecting an engine braking performance. Therefore, the rocker arm may have to be remanufactured in order to be reused with the engine braking system.

The present disclosure relates to a method 700 of remanufacturing the rocker arm 140. At step 702, the method 700 includes machining the socket portion 174 to remove the worn surface 194 and to form the seat 196. The seat 196 is configured to receive the insert member 202 therein. Machining the socket portion 174 may include machining the cylindrical seat section 197 and machining the frustoconical seat section 198. In an exemplary machining process, the rocker arm 140 may be mounted on a fixture associated with a machine tool. The machine tool may be one of a drilling machine, a boring machine, a milling machine, a lathe machine and the like. The rocker arm 140 may be secured to the fixture by any one or combination of fastening methods such as bolting, clamping, and any other method known in the art. The fixture may be located on a working surface of the machine tool. The rocker arm 140 may be mounted on the fixture in such a way that the axis 195 of the socket portion 174 may be aligned perpendicular to the working surface. The machine may include a tool holder to hold a cutting tool. A central axis of the cutting tool may be coaxially aligned with the axis 195 of the socket portion 174. The cutting tool may be then used to form the cylindrical seat section 197 and the frustoconical seat section 198 in one or more machining stages. It may also be contemplated that the cylindrical seat section 197 and the frustoconical seat section 198 may be machined using separate machine tools. Additional finishing processes, such as honing, may also be performed.

At step 704, the method 700 includes disposing the insert member 202 within the seat 196. The insert member 202 may be manually handled or secured in an electronically controlled tool. The insert member 202 may be guided above the socket portion 174. Further, the insert member 202 may be aligned with the seat 196. The insert member 202 may be then disposed within the seat 196.

At step 706, the method 700 includes coupling the insert member 202 to the seat 196. In an embodiment of the present disclosure, the insert member 202 may be coupled to the seat 196 by press fitting. In an example, the insert member 202 may be driven towards the end 222 of the socket portion 174 by a machine (e.g., a hydraulic press) to abut the bottom surface 210 of the insert member 202 against the surface 199 at the end 222 of the socket portion 174. Further, a press fit may be provided between the outer surface 218 of the cylindrical portion 204 and the inner peripheral surface 193 of the cylindrical seat section 197. Similarly, a press fit may be provided between the outer surface 220 of the frustoconical portion 208 and the inner peripheral surface 189 of the frustoconical seat section 198. In another embodiment of the present disclosure, the insert member 202 may be coupled to the seat 196 by welding. The outer surfaces 218, 220 of the cylindrical portion 204 and the frustoconical portion 208 may be aligned and engaged with the inner peripheral surfaces 193, 189 of the cylindrical seat section 197 and the frustoconical seat section 198, respectively. Further, the bottom surface 210 of the insert member 202 may be engaged with the surface 199 of the end 222. After the insert member 202 is engaged with the seat 196, the insert member 202 may be welded to the socket portion 174 by a welding machine. The insert member 202 may be welded to the seat 196 any known welding methods, for example, arc welding, gas welding, and the like.

In an embodiment, the hardness of the material of the insert member 202 may be higher than the hardness of the material of the rocker arm 140. The insert member 202 may consequently sustain reduced wear and result in a longer operational life of the remanufactured rocker arm. Further, the inner surface 214 of the insert member 202 may have a shape substantially similar to the original second inner surface 192. Moreover, a location of the inner surface 214 relative to the socket portion 174 may also be similar to a location of the second inner surface 192. Thus, engagement of the inner surface 214 with the braking member 168 may remain unchanged. The method 700 may therefore enable an existing rocker arm with wear to be remanufactured so as to be reusable in an engine. For example, the remanufactured rocker arm may be reused in the engine 100. This may be cost efficient as compared to replacement of the existing rocker arm with a new rocker arm.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of remanufacturing a rocker arm having a body defining a socket portion, the socket portion having a worn surface, the method comprising:
   machining a portion of the socket portion to remove the worn surface and forming a seat configured to receive an insert member therein;
   disposing the insert member within the seat; and
   fixedly coupling the insert member to the seat, forming a socket portion that is partially formed by the body of the arm and partially by the insert member.

2. The method of claim 1, wherein machining the socket portion comprises:
   machining a cylindrical seat section configured to receive a cylindrical portion of the insert member; and
   machining a frustoconical seat section adjacent to the cylindrical seat section, the frustoconical seat section configured to receive a frustoconical portion of the insert member.

3. The method of claim 1, wherein coupling the insert member to the seat comprises press fitting the insert member to the seat.

4. The method of claim 1, wherein coupling the insert member to the seat comprises welding the insert member to the seat.

5. The method of claim 1, wherein the seat is defined adjacent to an end of the socket portion.

6. The method of claim 1, wherein a hardness of the insert member is greater than a hardness of a material of the rocker arm.

7. A rocker arm comprising:
   a body defining an open socket portion, the socket portion configured to receive a braking member therein and to extend therefrom;
   a seat defined within the socket portion at an end thereof; and
   an insert member disposed within the seat of the socket portion and fixedly coupled to the socket portion, the insert member having an inner surface configured to engage with the braking member, wherein a portion of the socket portion is formed by the body of the arm and the remainder of the socket portion is formed by the insert member.

8. The rocker arm of claim 7, wherein the insert member comprises:
   a cylindrical portion; and
   a frustoconical portion disposed adjacent to the cylindrical portion.

9. The rocker arm of claim 8, wherein the seat comprises:
   a cylindrical seat section configured to receive the cylindrical portion of the insert member; and
   a frustoconical seat section adjacent to the cylindrical seat section, the frustoconical seat section configured to receive the frustoconical portion of the insert member.

10. The rocker arm of claim 7, wherein the insert member is press-fitted to the seat.

11. The rocker arm of claim 7, wherein the insert member is welded to the seat.

12. The rocker arm of claim 7, wherein the socket portion extends from a top surface of the body.

13. The rocker arm of claim 7, wherein a hardness of a material of the insert member is greater than a hardness of a material of the rocker arm.

14. The rocker arm of claim 13, wherein the material of the rocker arm has a hardness of Rockwell 15N 85.

15. The rocker arm of claim 13, wherein the material of the insert member has a hardness of at least Rockwell 30N 77.

16. An engine comprising:
    an engine body;
    an engine braking system disposed in the engine body, the engine braking system comprising a braking member; and
    a rocker arm pivotally disposed in the engine body, the rocker arm comprising:
        a body defining an open socket portion, the socket portion configured to receive the braking member therein and to extend therefrom;
        a seat defined within the socket portion at an end thereof; and
        an insert member disposed within the seat of the socket portion and fixedly coupled to the socket portion, the insert member having an inner surface configured to engage with the braking member, wherein a portion of the socket portion is formed by the body of the arm and the remainder of the socket portion is formed by the insert member.

17. The engine of claim 16, wherein the insert member comprises:
    a cylindrical portion; and
    a frustoconical portion disposed adjacent to the cylindrical portion.

18. The engine of claim 17, wherein the seat comprises:
    a cylindrical seat section configured to receive the cylindrical portion of the insert member; and
    a frustoconical seat section adjacent to the cylindrical seat section, the frustoconical seat section configured to receive the frustoconical portion of the insert member.

19. The engine of claim 16, wherein a hardness of a material of the insert member is greater than a hardness of a material of the rocker arm.

20. The rocker arm of claim 19, wherein the material of the rocker arm has a hardness of Rockwell 15N 85, and wherein the material of the insert member has a hardness of at least Rockwell 30N 77.

* * * * *